United States Patent [19]

Brown

[11] Patent Number: 5,087,362

[45] Date of Patent: Feb. 11, 1992

[54] FLUME DISTRIBUTION SYSTEM WITH REMOVABLE BLOCK

[75] Inventor: Marvin A. Brown, Sewickley, Pa.

[73] Assignee: F.B. Leopold COmpany, Inc., Zelienople, Pa.

[21] Appl. No.: 736,521

[22] Filed: Jul. 26, 1991

[51] Int. Cl.$^5$ .................... B01D 24/12; B01D 24/22; B01D 35/28

[52] U.S. Cl. ................................. 210/293; 210/274; 210/275

[58] Field of Search ............... 210/274, 275, 293, 279

[56] References Cited

U.S. PATENT DOCUMENTS

| | | | |
|---|---|---|---|
| 1,687,782 | 10/1928 | Norton | 210/293 |
| 1,883,468 | 10/1932 | Barbour | 210/293 |
| 2,716,490 | 8/1955 | Barston | 210/293 |
| 4,064,050 | 12/1977 | Heaney et al. | 210/293 |
| 4,065,391 | 12/1977 | Farabough | 210/293 |
| 4,214,992 | 7/1980 | Sasano et al. | 210/274 |
| 4,923,606 | 5/1990 | Gresh et al. | 210/293 |

*Primary Examiner*—Stanley S. Silverman
*Assistant Examiner*—Cynthia L. Nessler
*Attorney, Agent, or Firm*—Webb, Burden, Ziesenheim & Webb, P.C.

[57] ABSTRACT

A flume distribution system includes a distributor having a stationary lower portion and a removable upper portion. The lower portion defines a duct which is in fluid communication with a flume and at least one underdrain lateral. The lower portion also includes an apertured end wall which abuts one of the underdrain laterals at a lateral inlet, and a stop is disposed within the duct and spaced from the end wall. The duct receives a removable orifice plate which is adapted to pivot between a slant inactive position abutting the stop and an upright active position restricting the aperture in the end wall. During backwash operations, water is introduced to the flume and enters each duct in the lower portion of the distributor, and the pressure of the incoming water causes the orifice plate to pivot from the slant position to the upright position, reducing the cross-sectional area of the aperture in the end wall and thereby regulating the velocity of backwash flow from the flume into the lateral inlet. The orifice plate is held in place by a pressure differential across the plate, but it returns to the slant inactive position during filtration when flow through the system is reversed. The upper portion of the distributor may be removed as needed to place different sized orifice plates within the ducts for obtaining uniform backwash distribution.

20 Claims, 2 Drawing Sheets

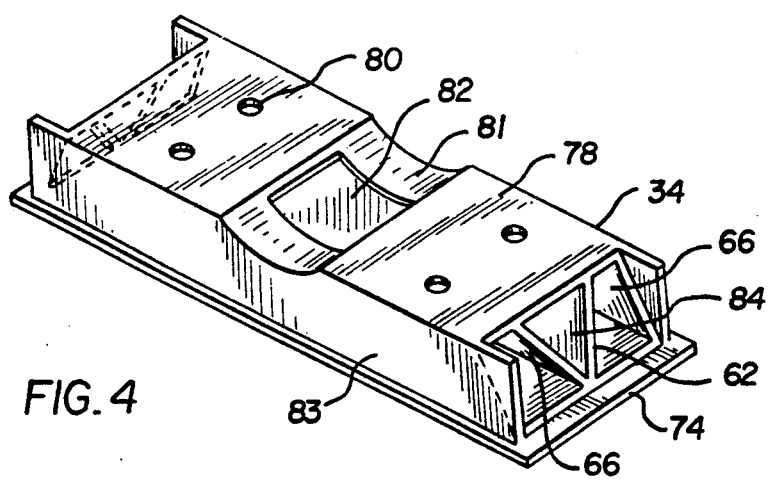
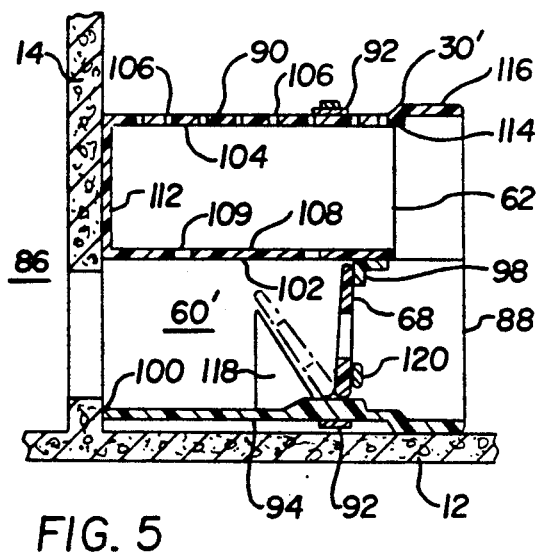
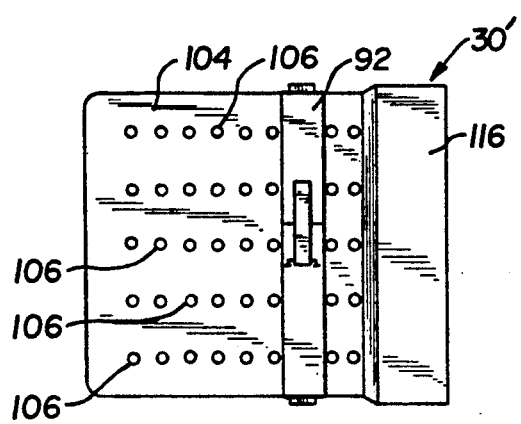
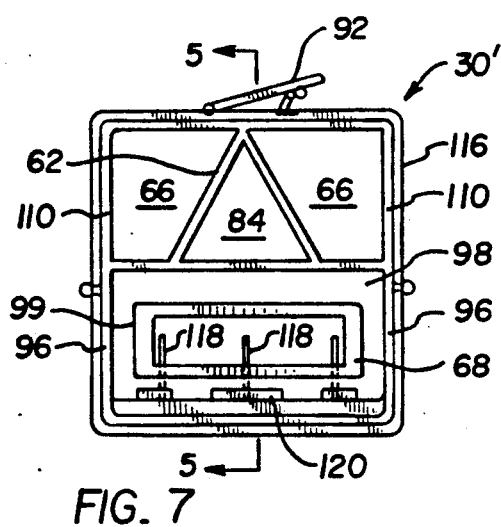
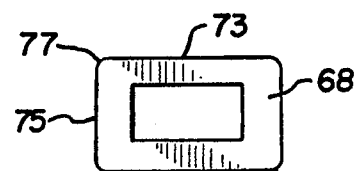
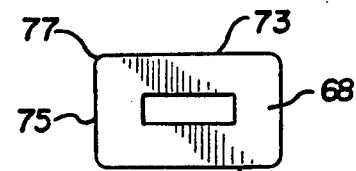
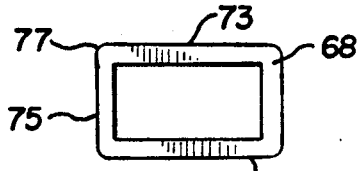

FLUME DISTRIBUTION SYSTEM WITH REMOVABLE BLOCK

BACKGROUND OF THE INVENTION

1. Field of the Invention

This invention relates to gravity filters having systems for distributing backwash fluids throughout a bed of granular media and, more particularly, to means for regulating the velocity of backwash liquids to ensure their uniform distribution into the filter media.

2. Description of the Prior Art

Gravity filters are used for various purposes, including filtering wastewater for a municipal water supply. The filters typically include a bed of granular media which is supported by an underdrain, and a flume receives filtered effluent from the underdrain and carries it away from the filter. Periodically, the granular media must be cleansed by initiating a "backwash" operation. During backwash, flow through the filter is reversed, and backwash liquid, typically filtered water, enters the flume which then distributes it to the underdrain. The underdrain distributes the backwash water into the granular media.

The underdrain usually includes a plurality of underdrain laterals which transverse the bottom of the filter and which may be formed from folded metal sheets, molded plastic blocks, or blocks and/or plates made from ceramic materials. Typical gravity filter underdrains are discussed in U.S. Pat. Nos. 2,154,167; 3,110,667; 3,468,422; 3,956,134; 4,065,391; 4,214,992 and 4,331,542. The flume may be recessed in the center of the filter floor, or it may be located behind one of the filter end walls.

To ensure proper performance of the gravity filter, it is critical that the backwash water is uniformly distributed to the bed of granular media. The degree to which the backwash system uniformly distributes water is conversely referred to as maldistribution. In newly constructed gravity filters, flume dimensions can be specified to keep backwash water velocities under two feet per second. At these velocities, maldistributions of $\pm 5\%$ over the top surface of the underdrain are readily obtained.

However, older filters have fixed flume dimensions which necessitate backwash water velocities as high as ten feet per second. As this high-speed flow proceeds down the flume and enters each lateral, the velocity becomes progressively lower. Since typical lateral inlets are all made with the same cross-sectional area, this variation in velocity and pressure head causes significant maldistribution into the laterals, easily in the range of $\pm 20$-$30\%$. Laterals toward the far end of the flume tend to fill up before those near the flume inlet. This maldistribution is carried over into the filter bed, causing media shifts, inadequate cleansing and other problems. Although the laterals themselves are usually designed to provide minimal maldistribution, the high maldistribution lateral inlet negates these advantages.

Hudson, Jr., "Water Clarification Processes Practical Design and Evaluation", Chapter 15 (1981) discloses a theory for varying the lateral inlet areas to reduce maldistribution. Hudson discusses "dividing-flow manifolds" which are analogous to flow patterns through a flume and into underdrain laterals. Essentially, Hudson suggests successive reduction of lateral inlet area along the manifold, but he notes that this can cause construction difficulties. He also suggests "adjustable gates" but states that plant operators find these unsatisfactory. For new construction jobs, Hudson believes that tapering the manifold to decrease the cross-sectional area, and hence keep a constant velocity, is the best solution. However, this solution limits future expansion alternatives and is clearly not suitable to retrofit jobs with fixed flume dimensions.

As Hudson theorized, different sized orifices may be placed in front of each lateral to equalize flow into the laterals, with larger orifices close to the flume inlet and smaller orifices toward the back of the flume. While the orifice sizing is calculable, many practical variables cannot be accounted for in the theoretical calculation. Due to the peculiarities of each gravity filter, an ideal system would permit convenient trial and error sizing of lateral inlets to ensure that backwash water enters each lateral at the same velocity, thus obtaining optimum backwash distribution from the underdrain into the bed of granular media. At present, this can only be done manually by entering the flume after the underdrain laterals have been installed to affix new orifices at each lateral inlet. Current underdrain lateral designs, which may require the application of adhesives and grouts, are not conducive to successive installment, removal and reinstallment of underdrain lateral components, and manual work within the confined flume may be hazardous. Certain flumes are even too small for a man to enter. Moreover, with the current state of the art, even if proper stationary orifices could be conveniently installed to equalize flow in the underdrain lateral during backwash, an uneven flow distribution during the filtration cycle would be created when flow is in the opposite direction.

Therefore, it is an object of the present invention to provide a flume distribution system which allows trial and error lateral inlet sizing without the necessity of entering the flume or replacing the underdrain laterals themselves. Additionally, it is an object of the invention to provide such a system without disturbing flow patterns when the filter is in the filtration mode. It is a still further object to provide such a system which is adaptable to a wide variety of flume configurations, for example, central flume, end flume and other designs.

SUMMARY OF THE INVENTION

Accordingly, I have invented an improved system for distributing a backwash liquid uniformly throughout a bed of granular media. The system includes a flume and a plurality of underdrain laterals positioned beneath and supporting the granular media. The underdrain laterals are divided by a plurality of walls into primary horizontal conduits and secondary horizontal conduits and contain liquid metering orifices that connect the primary conduits to the secondary conduits, with dispersion orifices that connect the secondary conduits to the bed of granular media. The underdrain laterals extend transverse to the flume, with each lateral having an inlet adjacent to the flume.

Means for supplying backwash liquid to the flume are provided whereby the liquid flows from the flume to the lateral inlets and into the primary conduits. From there, the liquid flows through the liquid metering orifices into the secondary conduits and through the dispersion orifices into the bed of granular media. During filtration, flow through the system is reversed and the flume receives and carries away filtered effluent from the underdrain laterals.

The improvement comprises a duct in fluid communication with the flume and with at least one lateral inlet. A stop is positioned within the duct and spaced from the inlet, and a removable orifice plate is housed within the duct facing the inlet. The orifice plate is movable between an active position restricting the inlet during backwash and an inactive position abutting the stop during filtration. Thus, when liquid is supplied to the flume during backwash, the orifice plate is caused by pressure to move from the inactive position to the active position, and the orifice plate is held in the active position by a pressure differential across the plate thereby reducing the cross-sectional area of the inlet and regulating the velocity of flow from the flume into the primary conduit. The orifice plate returns to the inactive position during filtration when flow through the system is reversed.

The orifice plate may be substantially rectangular with at least one orifice therein. Furthermore, the orifice plate may be free-floating within the duct and counterweighted so that its weight is concentrated near a lower edge of the plate.

A first embodiment of the invention is used with gravity filters having central flumes and includes an arched lower portion that extends above the flume. The lower portion includes a platform with two inclined apertured sidewalls depending therefrom, each sidewall facing one of the lateral inlets. The lower portion also includes two apertured end walls which are spaced from each sidewall and which abut one of the underdrain laterals at its inlet. Each end wall cooperates with one of the sidewalls to define a downwardly tapered duct having a slotted top. A removable orifice plate is disposed in each of the ducts and is adapted to pivot between the active position, wherein it is upright and restricts the aperture in the end wall, and the inactive position abutting the sidewall.

A separable upper portion has a planar upper deck and a parallel lower deck, the lower deck engagable on the platform of the lower portion. The upper portion is in fluid communication with at least one adjacent underdrain lateral and may be removably secured to the lower portion. The upper portion may be lifted from the lower portion to expose the slotted top of each duct for insertion and removal of different sized orifice plates to obtain optimum backwash distribution.

When liquid is introduced to the flume, it flows through the apertured sidewalls in the lower portion and into the ducts where the removable orifice plates are caused by pressure to pivot from the inactive position to the active position, thereby regulating the velocity of flow from the flume into the underdrain laterals. During filtration, the orifice plates return to the slant position abutting the sidewalls.

A second embodiment of the invention is adapted for use with gravity filters having end flumes, and this embodiment has a lower portion with at least two upstanding sidewalls and an apertured front wall that abuts one of the underdrain laterals at its inlet. The lower portion also includes an open back end which is adjacent to the end flume, and the lower portion has an open top. A separable upper portion has an upper deck and a parallel lower deck with at least two sidewalls extending between the upper and lower decks. The upper portion also has an open front end with the lower deck engagable on the upstanding sidewalls and front wall of the lower portion. At least two triangular upstanding fins are disposed within the lower portion parallel to the sidewalls and spaced from the front wall. The upper portion may be removably secured to the lower portion as in the first embodiment.

The lower portion receives a removable orifice plate which is adapted to pivot between the active position, wherein the plate is upright and abuts the inside of the front wall, and the inactive position, wherein the plate is slanted and abuts the fins. Thus, when backwash liquid is supplied to the end flume, it enters the back end of the lower portion and the orifice plate is caused by pressure to pivot and abut the front wall, restricting the aperture therein. The velocity of flow from the end flume into the underdrain lateral is thereby regulated.

BRIEF DESCRIPTION OF THE DRAWINGS

FIG. 4 is a bottom perspective view of an upper portion of the embodiment of FIG. 1;

FIG. 5 is a sectional view of a second embodiment of the invention;

FIG. 6 is a plan view of the embodiment of FIG. 5;

FIG. 7 is a front view of the embodiment of FIG. 5; and

FIGS. 8, 9 and 10 are front elevations showing three removable orifice plates according to the present invention, each having a different sized orifice therein.

DETAILED DESCRIPTION OF THE PREFERRED EMBODIMENTS

Figure 1:
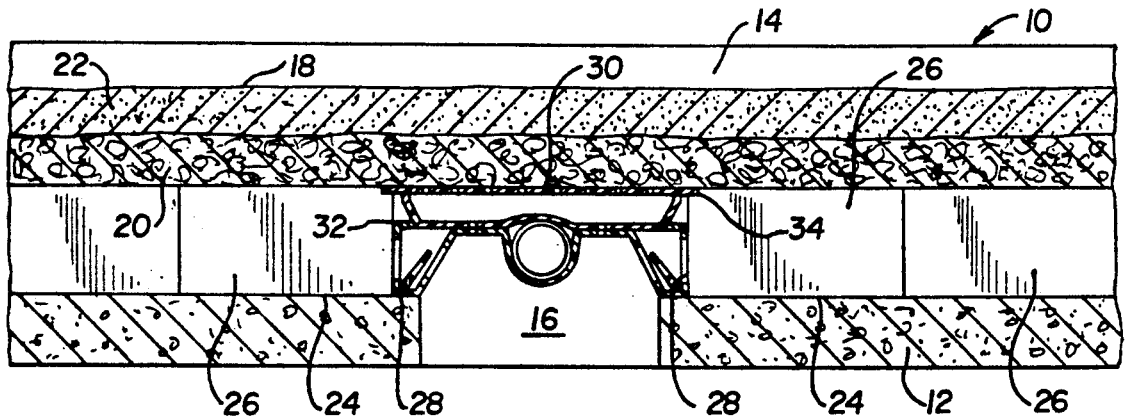
FIG. 1 is a sectional view showing a first embodiment of the invention incorporated in a gravity filter.

FIG. 1 shows a filter cell 10 having a floor 12 and an end wall 14. The floor 12 includes a recessed central flume 16 which typically extends the entire length of the filter cell 10 for collecting effluent and distributing backwash liquids, as is well-known in the art. The filter cell 10 includes a bed 18 of granular media which usually includes a gravel layer 20 and a fine grain layer 22. The bed is supported by a plurality of underdrain laterals 24 which cover the floor 12 and extend transverse to the flume 16. Various underdrain lateral constructions are well-known in the art. It is not intended to limit application of the invention to one particular construction.

For example, the underdrain laterals may be constructed from folded metal sheets and perforated plates or they may comprise ceramic blocks and/or plates. The underdrain laterals 24 in FIG. 1 are comprised of a plurality of molded plastic blocks 26 arranged end-to-end in parallel rows across the floor 12 of filter cell 10. As stated, these rows transverse the central flume 16, and each underdrain lateral 24 has an inlet 28 adjacent the flume 16. Although not shown, each block 26 has a plurality of dispersion orifices in a top wall 27 for receiving filtered effluent from bed 18 in a filtration mode and for dispersing backwash liquid and gas into bed 18 during a backwash mode.

Figure 2:
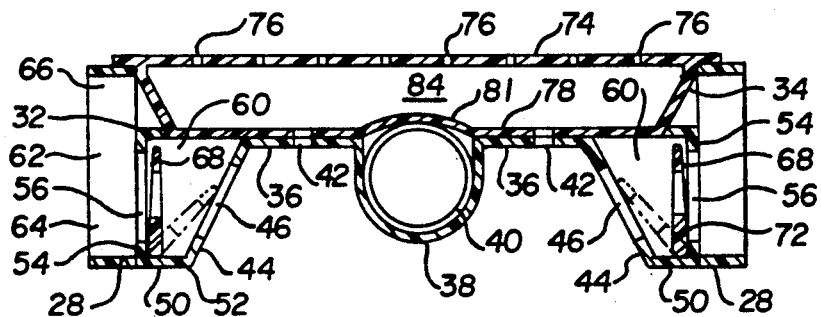
FIG. 2 is an enlarged sectional view of the embodiment of FIG. 1.
Figure 3:
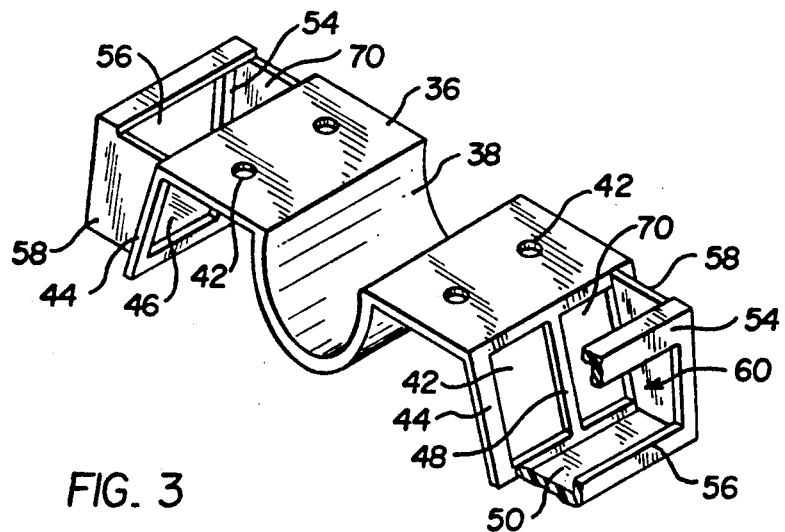
FIG. 3 is a perspective view of the lower portion of the embodiment of FIG. 1.

A distributor 30 in accordance with a first embodiment of the invention extends above flume 16 and adjoins two underdrain laterals 24. Referring to FIGS. 2 and 3, the distributor 30 has a stationary lower portion 32 and a separable upper portion 34. The lower portion 32 includes a platform 36 which extends above flume 16 and includes a central trough 38 for receiving a gas manifold 40. The platform 36 also includes a plurality of orifices 42. Two inclined sidewalls 44 depend from platform 36, and each includes a pair of apertures 46. The apertures are separated by a cross brace 48, and the sidewalls 44 face lateral inlets 28 when the lower portion 32 is in place.

A horizontal base 50 extends from a lower end 52 of each sidewall 44 and engages floor 12. An upstanding end wall 54 having an aperture 56 is located at the opposite edge of each base 50 from sidewalls 44. Thus, each end wall 54 is spaced from one of the sidewalls 44 and abuts a lateral 24 at its inlet 28, as shown in FIG. 2. Two partitions 58 extend between each sidewall 44 and end wall 54 to define a downwardly tapered duct 60. Referring specifically to FIG. 2, each lateral 24 is divided by a plurality of walls 62 into at least one primary horizontal conduit 64 and at least one secondary horizontal conduit 66. Each duct 60 intercommunicates with the flume 16 and at least one primary conduit 64 in its adjoining underdrain lateral 24.

Each duct 60 receives a removable orifice plate 68 through a slotted top 70. The orifice plate 68 is adapted to pivot from an inactive slant position abutting sidewall 44 and cross brace 48 to an active upright position abutting end wall 54 and vice versa. When upright, the orifice plate 68 restricts aperture 56 in end wall 54 by reducing its cross-sectional area. A pressure differential across the orifice plate holds it in the active position, and the orifice plate substantially seals end wall 54 so that any liquid entering lateral inlet 28 must first pass through orifice plate 68. When slanted, the sidewall 44 and cross brace 48 provide a stop means to keep the orifice plate 68 from becoming completely horizontal or from falling into flume 16.

The orifice plates 68 may be free-floating within ducts 60, in which case it is preferred that they be counterweighted with a majority of their weight concentrated near the lower edge 72 of each plate 68 as shown in FIG. 2. This enhances the pivot action of the plate and serves to stabilize the plate within the duct 60. Additionally, the counterweighting reduces the likelihood that operation of the plate will be obstructed by fine grain filter media, which may migrate into the duct during the filtration mode. Alternatively, the orifice plates may be removably secured to a hinge within ducts 60. The hinge may be secured to the lower edge 72 of the orifice plates 68, or the plates may be hingedly suspended from their top edge 73. FIGS. 8-10 show several plates 68 having rectangular orifices of varying sizes therein. Finally, the orifice plates may have rounded edges 72, 73, 75 and corners 77 to facilitate movement within the ducts 60.

Referring to FIGS. 2 and 4, upper portion 34 has an upper deck 74 with a plurality of orifices 76 and a parallel lower deck 78. A pair of sidewalls 83 extend between upper deck 74 and lower deck 78. The lower deck 78 engages platform 36 on lower portion 32 and has orifices 80 which correspond to orifices 42 in the platform. The upper portion 34 also includes a curved recess 81 which conforms to gas manifold 40 and includes a window 82 for placing gas manifold 40 in fluid communication with a central gas conduit 84 in upper portion 34. Thus, backwash gas may be supplied to each lateral 24 which adjoins distributor 30. Upper portion 34 also includes two secondary horizontal conduits 66 on either side of central gas conduit 84 wherein backwash air and water can mix before proceeding through dispersion orifices 76. This configuration is the subject of a separate, commonly owned, U.S. patent application Ser. No. 07/649,448, filed Feb. 2, 1991, entitled "Filter Underdrain Block". The upper portion 34 may be removably secured to the lower portion 32 by various means well-known in the art, including a stainless steel band which wraps around both the upper and lower portions, a post and pin arrangement, or a threaded post and nut arrangement.

During backwash operations, filtered water is introduced to the flume 16 by known means. As the water flows down flume 16, it proceeds through the apertures 46 in inclined sidewalls 44 and enters ducts 60. The pressure of incoming water forces the orifice plates 68 to pivot from the slant position to the upright position, partially enclosing the apertures 56 in end walls 54. Importantly, the apertured sidewalls 44 and cross braces 48 do not completely "shadow" the orifice plate 68 no matter how low the plate slants within duct 60. This ensures that incoming water can impinge upon the upper portion of the plate and cause it to pivot. The pressure differential across the plate holds it in place, and the water entering each inlet 28 thus has a velocity controlled by the cross-sectional area of the orifice in each particular plate 68. Additionally, backwash water enters the orifices 42 in platform 36 and proceeds to the secondary conduits 66 in upper portion 34 where it mixes with gas from central gas conduit 84. The backwash air/water mix then enters the filter bed 18 through dispersion orifices 76. This avoids the problem of dead spots within the filter bed 18 and ensures that the areas directly above the distributors 30 are effectively cleansed.

In the filtration mode, flow through the bed 18 is reversed with filtrate entering each underdrain lateral 24 through its dispersion orifices and proceeding toward flume 16. The orifice plates 68 thus experience pressure from the direction opposite to the flow of backwash liquid, and therefore, the plates pivot from the upright position to the inactive slant position abutting the sidewalls 44 and cross braces 48. Thus, the apertures 56 are no longer restricted and all the filtrate in the filter cell 10 is exposed to the same cross-sectional area when exiting the underdrain laterals 24. This ensures even filtration flow through bed 18.

Referring to FIGS. 5-7, a second embodiment 30' of the distributor which is suitable for use with a filter cell having an end flume 86 is shown. The distributor 30' includes a stationary lower portion 88 and a removable upper portion 90 with a steel band 92 for securing the two portions 88, 90 together. The lower portion 88 includes a base 94 which engages the floor 12 of filter cell 10 and two upstanding sidewalls 96. The lower portion 88 also includes a front wall 98 having an aperture 99, while an end 100 of lower portion 88 adjacent the wall 14 is open and in fluid communication with end flume 86. A top 102 of the lower portion is also open.

The upper portion 90 has an upper deck 104 with a plurality of orifices 106 and a parallel lower deck 108 with orifices 109. Two sidewalls 110 extend between the upper deck 104 and the lower deck 108 and a back wall 112 abuts the wall 14 of filter cell 10. A front end 114 of the upper portion 90 is open. Additionally, a mouth 116 extends from the front end 114 of the upper portion and front wall 98 of the lower portion for receiving the inlet 28 of an underdrain lateral. The lower deck 108 of the upper portion 90 is engagable on the upstanding sidewalls 96 and front wall 98 of the lower portion 88 to define a duct 60', which is in fluid communication with one of the lateral inlets 28 and the end flume 86.

Three triangular upstanding fins 118 are disposed within the duct 60' and are secured to the base 94 of lower portion 88. The fins 118 may be integrally molded with lower portion 88 or they may be secured by fusion welding. Alternatively, the fins 118 may depend from the lower deck 108 of upper portion 90, extending downward into duct 60'. The fins 118 are spaced from front wall 98 to provide stop means for orifice plate 68 when it is in the slant position as shown in FIG. 4.

When backwash water is supplied to end flume 86, it enters the open end 100 of lower portion 88 and the orifice plate 68 is caused by pressure to pivot from the slant position to the upright position abutting the apertured front wall 98. Thus, the cross-sectional area of the aperture 99 in front wall 98 is partially reduced, thereby regulating the velocity of flow from the end flume 86 into the underdrain lateral 24. Additionally, water flows through the orifices 109 in lower deck 108 into upper portion 90 and from there through dispersion orifices 106 into the granular bed 18.

Finally, the front wall 98 on lower portion 88 includes a plurality of media flush ports 120 so that any media entering duct 60' during filtration will be periodically flushed by backwash flow. This ensures unhindered pivot action by the orifice plates 68.

Since the upper portion of each distributor 30, 30' is removable, several test runs may be conducted wherein different sized orifice plates 68 are placed in the various ducts 60, 60' to completely equalize the distribution of backwash liquid throughout the underdrain laterals 24. It will be understood that the test runs are to be conducted prior to installation of the granular bed 18 so that one only need remove the upper portions of the removable blocks to alter the entire distribution scheme throughout the underdrain laterals. Dangerous work within the confined flumes is no longer required. To measure maldistribution, piezometric taps can be made across the underdrain laterals, with upstanding, clear plastic tubes attached to each tap. The pressure head at each tap can be measured and the maldistribution calculated by known methods. Different sized orifice plates can be placed at each lateral inlet by trial and error until the desired maldistribution value is achieved.

Having described the presently preferred embodiments of the invention, it will be understood that it is not intended to limit the invention except within the scope of the following claims.

I claim:

1. In a system for receiving effluent from a bed of granular media during a filtration mode and distributing a backwash liquid uniformly throughout said bed during a backwash mode, including:

a flume;

a plurality of underdrain laterals positioned beneath and supporting said bed of granular media, said underdrain laterals divided by a plurality of walls into primary horizontal conduits and secondary horizontal conduits and containing liquid metering orifices that connect said primary conduits to said secondary conduits and dispersion orifices that connect said secondary conduits to said bed of granular media;

said underdrain laterals extending transverse to said flume, each lateral having an inlet adjacent said flume; and means for supplying backwash liquid to said flume, whereby said liquid flows from said flume to the lateral inlets and into said primary conduits, through said liquid metering orifices into said secondary conduits, and through said dispersion orifices into said bed;

the improvement comprising:

a duct in fluid communication with said flume and with at least one lateral inlet;

a stop positioned within said duct and spaced from said inlet;

a removable orifice plate housed within said duct facing said inlet, said orifice plate movable between an active position restricting said inlet during backwash and an inactive position abutting said stop during filtration;

said orifice plate caused by backwash pressure to move from the inactive position to the active position when liquid is supplied to said flume, and the orifice plate is held in the active position by a pressure differential across the orifice plate thereby reducing the cross-sectional area of said inlet and regulating the velocity of flow from said flume into said primary conduit, said orifice plate returning to the inactive position abutting said stop during filtration when flow through the system is reversed.

2. The improvement of claim 1 wherein said orifice plate is a substantially rectangular plate having at least one orifice therein.

3. The improvement of claim 1 wherein said orifice plate is free-floating within said duct and is counterweighted so that its weight is concentrated near a lower edge of the plate.

4. The improvement of claim 1 wherein said underdrain laterals comprise a plurality of blocks arranged in parallel adjacent rows with said primary and secondary conduits extending from block to block along said rows, said stop and said orifice plate housed in a separable block having a removable upper portion and a stationary lower portion which define said duct.

5. The improvement of claim 4 wherein said lower portion has at least one inclined apertured sidewall facing the lateral inlet, and an upstanding apertured end wall spaced from said sidewall and adjacent the lateral inlet with two partitions extending between said sidewall and end wall to define said duct, said orifice plate adapted to pivot between said inclined sidewall and said apertured end wall, whereby when liquid is supplied to said flume, it passes through said inclined apertured sidewall into said duct, causing said orifice plate to pivot to the active position, restricting the aperture in said end wall and regulating the velocity of flow from said flume into said lateral inlet.

6. The improvement of claim 4 wherein said lower portion has two upstanding sidewalls and an apertured front wall which define said duct, with at least two triangular upstanding fins disposed within said duct parallel to said sidewalls and spaced from said front wall, said orifice plate adapted to pivot between the active position abutting said front wall and the inactive position abutting said fins.

7. A distributor for backwash fluids in a granular bed filter system having a central flume with a plurality of underdrain laterals transversing said flume and supporting said granular bed, each underdrain lateral having at least one primary horizontal conduit therein with each conduit having an inlet adjacent said flume, said flume receiving filtered effluent from said underdrain laterals during a filtration mode and supplying backwash liquid to said underdrain laterals during a backwash mode, said distributor comprising:

an arched lower portion having a platform with two inclined, apertured sidewalls depending therefrom, said platform extending above said flume with each sidewall facing one of said inlets, each sidewall cooperating with an upstanding apertured end wall which is spaced from each sidewall and which abuts one of said underdrain laterals at said inlet to define a downwardly tapered duct having a slotted top;

a removable orifice plate disposed in each of said ducts and adapted to pivot between an upright active position restricting the aperture in said end wall and a slant inactive position abutting said sidewall;

a separable upper portion having a planar upper deck and a parallel lower deck, said lower deck engagable on the platform of said lower portion, said upper portion in fluid communication with at least one adjacent underdrain lateral; and means for removably securing said upper portion to said lower portion so that said upper portion may be lifted from said lower portion to expose the slotted top of each duct for insertion and removal of said orifice plates;

wherein liquid is introduced to said flume during backwash and flows through said apertured sidewalls in the lower portion and into said ducts where said removable orifice plates are caused by pressure to pivot from the inactive position to the active position, said orifice plates held in the active position by a pressure differential across the plates thereby regulating the velocity of flow from said flume into said underdrain laterals, said orifice plates returning to the inactive position during filtration when flow through the system is reversed.

8. The distributor of claim 7 including a central trough in the platform of said lower portion for receiving a gas manifold.

9. The distributor of claim 7 including a plurality of orifices in said platform, lower deck and upper deck, the orifices in said platform corresponding to the orifices in said lower deck, wherein liquid flows from said flume through said apertured sidewalls and also through the orifices in said platform and said lower deck, and through the orifices in said upper deck into the granular bed.

10. The distributor of claim 8 wherein said upper portion includes a central gas conduit in fluid communication with said gas manifold.

11. The distributor of claim 7 wherein said removable orifice plates are substantially rectangular plates having at least one orifice therein, said plates further being counterweighted so that their weight is concentrated near a lower edge of the plate.

12. The distributor of claim 7 wherein said downwardly tapered ducts are substantially triangular in cross-section.

13. The distributor of claim 7 wherein said distributor comprises a separable block and said underdrain laterals comprise a plurality of blocks arranged in parallel adjacent rows, each block having at least one primary horizontal conduit and at least one secondary horizontal conduit, said primary and secondary conduits extending from block to block along said rows, each orifice plate housed within the lower portion of said separable block and controlling the velocity of flow from said flume into at least one of said primary conduits.

14. A distributor for backwash fluids in a granular bed filter system having an end flume with a plurality of underdrain laterals supporting said granular bed and extending transverse to said end flume, each underdrain lateral having an inlet which faces said end flume, said flume receiving filtered effluent from said underdrain laterals during a filtration mode and supplying backwash liquid to said underdrain laterals during a backwash mode, said distributor comprising:

a lower portion having at least two upstanding sidewalls with an apertured front wall that abuts one of said underdrain laterals at said inlet, an open back end that is adjacent said end flume and an open top;

a separable upper portion with an upper deck and a parallel lower deck, and at least two sidewalls extending between said upper and lower decks, said upper portion having an open front end with said lower deck engagable on the upstanding sidewalls and front wall of said lower portion;

at least two triangular upstanding fins disposed within said lower portion parallel to said sidewalls and spaced from said front wall;

said lower portion receiving a removable orifice plate which is adapted to pivot between an upright active position restricting the aperture in said front wall and a slant inactive position abutting said fins; and means for removably securing said upper portion to said lower portion so that said upper portion may be lifted from said lower portion to expose the open top for insertion and removal of said orifice plate;

wherein liquid is introduced to said end flume during backwash and enters the back end of said lower portion, causing said orifice plate to pivot and abut the front wall, restricting the aperture therein, said orifice plate held in place by a pressure differential across the plate thereby regulating the velocity of flow from said flume into said underdrain lateral, said orifice plate returning to the inactive position abutting said fins during filtration when flow through the system is reversed.

15. The distributor of claim 14 including a plurality of orifices in the upper and lower decks of said upper portion whereby liquid enters said lower portion, flows through the orifices in said lower deck and through the orifices in said upper deck into the granular bed.

16. The distributor of claim 14 wherein said orifice plate is a substantially rectangular plate having at least one orifice therein, and further wherein said orifice plate is counterweighted so that its weight is concentrated near a lower edge of the plate.

17. The distributor of claim 14 including a plurality of media flush ports in the front wall of said lower portion.

18. The distributor of claim 14 wherein said means for removably securing said upper portion to said lower portion includes a stainless steel band.

19. The distributor of claim 14 wherein said distributor comprises a separable block and said underdrain laterals comprise a plurality of blocks arranged end to end in parallel adjacent rows, each block having at least one primary horizontal conduit and at least one secondary horizontal conduit, said primary and secondary conduits extending from block to block along said rows, each orifice plate housed within the lower portion of one of said separable blocks to control the velocity of flow from said flume into at least one of said primary conduits.

20. The distributor of claim 19 including a mouth on the front of said distributor extending from the front end of said upper portion and the front wall of said lower portion for receiving an end of an underdrain block which faces said end flume.

* * * * *

UNITED STATES PATENT AND TRADEMARK OFFICE
CERTIFICATE OF CORRECTION

PATENT NO. : 5,087,362
DATED : February 11, 1992
INVENTOR(S) : Marvin A. Brown

It is certified that error appears in the above-identified patent and that said Letters Patent is hereby corrected as shown below:

Title page, after [73] Assignee: "F.B. Leopold COmpany, Inc."
should read --F.B. Leopold Company, Inc.--.

Column 6 Line 45 "30," should read --30'--.

Signed and Sealed this

Eighth Day of June, 1993

Attest:

MICHAEL K. KIRK

Attesting Officer

Acting Commissioner of Patents and Trademarks